Patented Nov. 17, 1942

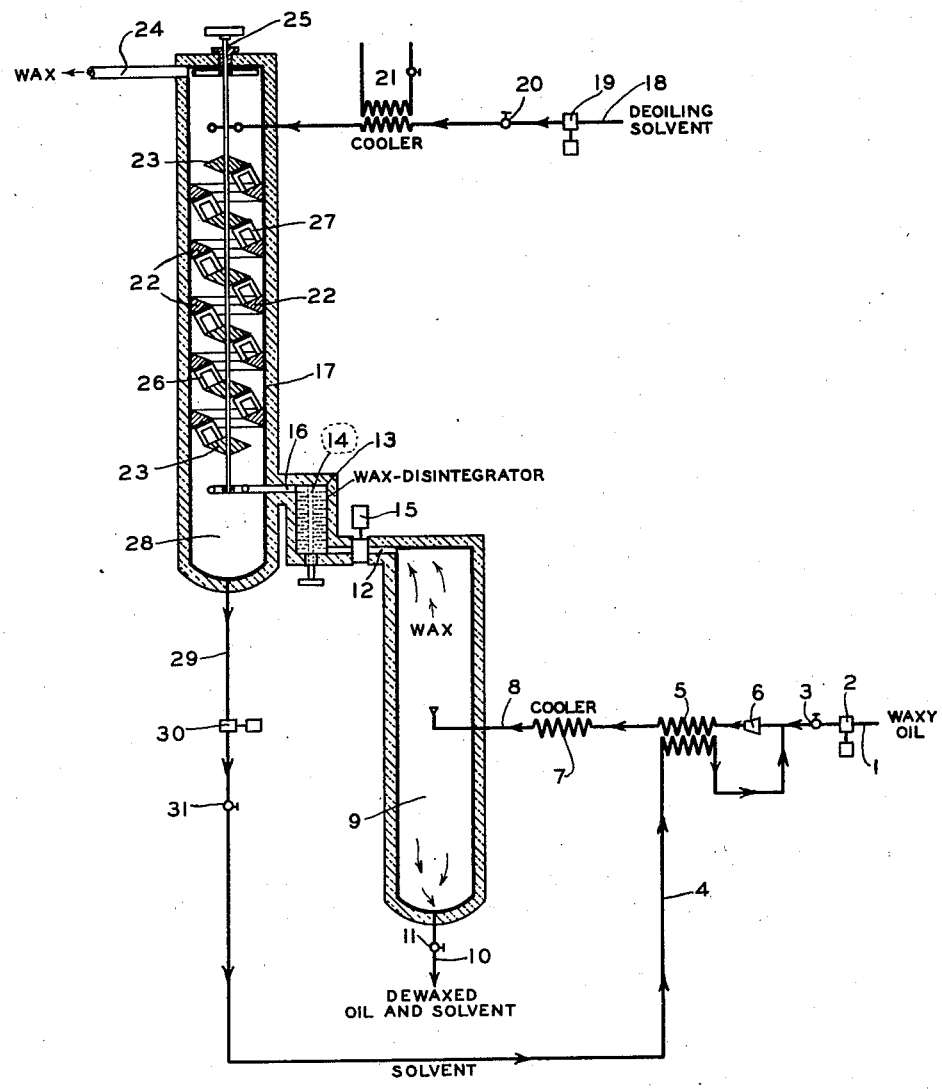

2,302,432

UNITED STATES PATENT OFFICE 2,302,432

APPARATUS FOR SEPARATING WAXES FROM OILS

Eddie M. Dons and Oswald G. Mauro, Tulsa, Okla., assignors to Mid-Continent Petroleum Corporation, Tulsa, Okla., a corporation of Delaware Application December 26, 1941, Serial No. 424,398

7 Claims. (Cl. 196—18)

This invention relates to apparatus for separating waxes from oils. The invention may be employed in separating wax and oil found in various kinds of materials including mineral oils, petrolatum, slack wax and vegetable waxes. It can be conveniently used in dewaxing petroleum lubricating oils to produce low pour point lubricants, or in obtaining high melting point waxes from petrolatum, and in separating constituents of slack wax, as well as in the treatment of other products to separate waxy materials.

In this art, it is customary to resort to filtering operations which do not remove all of the oil from the wax. A large mass of precipitated wax is usually deposited on the filter in the form of clusters of interlocked wax crystals with oil-retaining cavities inside of the clusters, and additional bodies of diluted oil are trapped between the clusters on the filter. A substantial percentage of the oil is thus retained in the mass of wax.

An object of the present invention is to avoid the expense and trouble heretofore involved in the use of extremely large filters to separate the body of diluted oil from the wax, at the same time providing a less expensive system wherein the oil is more effectively removed from the wax particles. More specifically stated, an object is to provide a commercially feasible improvement including dewaxing means to separate free oil solution from coalesced wax crystals, a releasing device to forcibly disintegrate the coalesced wax, thereby positively liberating trapped or occluded oil solution, and means for deoiling the disintegrated wax particles. A simple settling operation may be employed to separate free oil solution from the coalesced wax particles, while a more active counterflow system is preferably employed to forcibly remove the liberated oil solution from the disintegrated wax particles.

With the foregoing and other objects in view, the invention comprises the novel apparatus hereinafter more specifically described and shown in the accompanying drawing, which illustrates one form of the invention. However, it is to be understood that the invention comprehends changes, variations and modifications within the scope of the claims hereunto appended.

Briefly stated, the preferred form of the invention comprises the cooperative effects of a series of devices, including means for precipitating the wax in a cooled dewaxing solution, means for extracting the main body of relatively free oil solution from coalesced wax crystals, and means for subjecting the coalesced wax to forcible disintegrating and deoiling operations wherein previously trapped solution is forcibly removed from the wax.

In comparing this apparatus with the usual filtering systems wherein a solvent is sprayed onto the wax deposited on the surface of the filter, it will be observed that the so called "wax cake" on the filter is in the form of a compact body of wax clusters with oil particles trapped, or occluded, throughout the mass of wax, and that the spray of solvent can not effectively remove such oil. This is quite different from the very simple cleansing action which occurs when a stream of the wax clusters and oil solution is merely discharged into a settling zone where the wax clusters readily separate from the relatively free oil solution, and then pass to a disintegrating zone associated with a deoiling zone where each minute wax particle is exposed to the forcible cleansing action of a counterflowing solvent stream. In this manner we can positively remove and economically recover a substantial percentage of valuable oil which ordinarily remains as an impurity in the wax.

It is to be understood that such unusual efficiency in removing and purifying the wax also increases the yield of dewaxed oil, and in many cases the main object is to remove and recover the optimum percentage of dewaxed oil, without resorting to expensive refining operations.

The wax may be precipitated in any desired manner and at any suitable temperature, a low temperature being required in dewaxing lubricating oils to produce low pour point lubricants, while much higher temperatures are usually desired for the precipitation of high melting point wax in petrolatum, or in the separation of high melting point wax from low melting point wax which may or may not contain a substantial percentage of oil. As previously indicated, the precipitated wax particles are in the form of clusters, and the gravity separation of the wax and dewaxed solution may be due to a relatively high density of the solution, or to a relatively high density of the wax particles. Advantages are gained in a true counterflow wherein a rising stream of wax particles contacts directly with a continuous descending stream of cleansing solvent, but this condition may be reversed, and various types of batch systems could be employed to obtain some of the advantages of the invention.

However, the preferred form of the invention includes a means for precipitating wax in a solution, followed by gravity separation of coalesced wax from free portions of the solution in a dewaxing apparatus, and then forcibly disintegrating a continuous stream of the coalesced wax in a releasing device which forcibly releases the trapped oil solution before the wax reaches a counter-current deoiling zone.

The countercurrent deoiling operation may be carried out to any desired extent, depending upon economic conditions or the nature of the products sought in the process. In some cases, more or less of the oil may be deliberately retained in the wax, thereby reducing the time factor in the countercurrent deoiling zone where the liberated oil solution is forcibly removed from the disintegrated wax particles.

To most effectively establish and maintain the new combination of conditions, the nature of the solvents requires consideration, not with the idea of producing filterable wax, but to provide for comparatively rapid movements of the wax and other conditions in the new process. The density or specific gravity of the solvent is an important consideration in the step of causing the rapid gravity separation of the wax from the dewaxing solution, and also in the subsequent step of passing the stream of distintegrated wax particles through a counterflowng stream of cleansing solution. The viscosity of the solution and solvent even at very low temperatures, is another factor that should not prevent the desired free and rapid movements of the wax particles. Another property of the solvent relates to the interfacial tension existing between the wax particles and the oil solution, or between said wax particles and the deoiling solvent. This interfacial tension is a subject separate and distinct from the viscosity, and it should not be high enough to interfere with said free and rapid movements of the wax particles, even when the operations are carried out at very low temperatures, such as 0° F., or lower. However, the invention is not limited to a particular solvent, as the various properties can be obtained from numerous different solvents.

Illustrations of suitable solvents include methylene dichloride combined with dichlorethyl ether or sulfur dioxide; methylene dichloride combined with acetone, or with isopropyl acetate and dichlorethyl ether; sulfur dioxide mixed with dichlorodifluoromethane, or with perchlorethylene; or a mixture of dichlorethyl ether and perchlorethylene; or methylene dichloride with ethyl bromide. Mixtures of three or more solvents may be employed. However, for convenience in commercial practice, methylene dichloride and dichlorethyl ether (chlorex) provide a desirable combination of only two solvents.

The accompanying drawing is a diagrammatical view of a system which may be employed to carry out one form of the invention.

A continuous regulated stream of the wax-bearing charging stock, for example, a lubricating oil stock, enters the system through a pipe 1 which may be provided with a pump 2 and a regulating valve 3. A continuous stream of selective dewaxing solvent, from sources to be hereafter described, may be conducted through a pipe 4 and heat exchanger 5 to the oil supply pipe 1. The continuous streams of oil and dewaxing solvent are united in the pipe 1 and transmitted through a mixing nozzle 6 where the oil and solvent are mixed at a temperature high enough to form the desired dewaxing solution.

The continuous stream of solution is transmitted through the heat exchanger 5 for preliminary cooling. Thereafter, the stream of solution passes through a cooler, or chiller, 7 where the flowing solution is cooled to a temperature desired for precipitation of wax in the liquid solution. The wax crystals are thus coalesced to form relatively large clusters, with portions of the liquid oil solution trapped or occluded in the wax clusters.

If desired, the resultant mixture of solution and precipitated wax clusters may be transmitted through a pipe 8 arranged to conduct a continuous stream of the wax clusters and solution into a settling chamber 9. This chamber 9 may be in the form of an upright column covered with insulation.

The incoming stream of chilled solution and wax may be delivered from the pipe 8 to the settling chamber 9 at approximately the temperature selected for precipitation of wax in the cooler, or chiller, 7. For example, this temperature may be about 0° F., and we prefer to insulate the chamber 9 to maintain the desired dewaxing temperatures therein.

We are assuming that a relatively dense or heavy solvent has been selected for the dewaxing operation, and that the viscosity and interfacial tension are low enough to allow the wax to freely rise in the dense solution. In this event, the major portion of the free oil solution will readily move downwardly to the bottom of the settling compartment 9 where it is discharged through a pipe 10, said pipe having a regulating valve 11 adjusted to regulate the flow therein. This outgoing solution is free of wax and it may be distilled in any suitable manner to remove the solvent from the dewaxed oil. It will be observed that most of the oil is very easily, quickly and economically dewaxed in the simple settling chamber 9, and immediately discharged from the dewaxing system.

Attention is now directed to the separating zone, or dewaxing zone established near the point where the incoming mixture of cooled solution and from pipe 8 enters the settling chamber 9. The mass of wax particles move upwardly and carry with them portions of the solution, including oily films around the wax particles and relatively free portions of the solution between the rising wax particles.

The rising mass of wax clusters, or wax particles, coalesce and occlude portions of the liquid oil solution in the settling chamber 9. However, a continuous stream of the coalesced wax and oil solution is discharged through a pipe 12 at the upper portion of said chamber 9 to a separate disintegrating chamber 13 containing a rotary wax breaker 14 whereby the coalesced wax is forcibly disintegrated to positively liberate the occluded oil solution from the wax clusters. The distintegrating chamber 13 is covered with insulation, and a pump 15 may be employed to positively force a continuous stream of waxy material into said chamber.

The resultant continuous stream of disintegrated wax particles and liberated oil solution is discharged through a pipe 16 which forms the inlet of a countercurrent deoiling system, including an insulated chamber 17. This countercurrent system may be designed to transmit a continuous stream of relatively heavy selective oil solvent through a rising stream of lighter wax particles. For example, a regulated stream of selective oil solvent may be transmitted through a pipe 18 provided with a pump 19, regulating valve 20, and cooler 21 through which the solvent stream is conducted into an upper portion of the chamber. The temperature of this regulated stream may be about the same as, or preferably a few degrees higher than the temperature in the dewaxing zone 9.

When a heavy deoiling solvent is employed, the stream of deoiling solvent from the cooler 21 will descend in direct contact with the rising stream of distintegrated wax particles, so as to selectively dissolve the free portions of oil solution carried by the wax, and also forcibly scrub the oily films from the rising wax particles. This action may be aided by any suitable mechanical appliances. For example, the upper portion of the chamber 17 may be provided with alternating baffles including a series of rings 22 extending inwardly from the inner face of the chamber 17 and a series of central baffle members 23 arranged as shown in the drawing to produce an elongated tortuous passageway wherein the rising wax particles move back and forth in a zigzag course. The stream of selective deoiling solvent descends through the rising stream of wax particles, and the counterflowing streams are divided into numerous layers of different specific gravities contacting with each other and advancing in intersecting paths as they flow from one baffle to another. These baffles are preferably provided with upwardly inclined top and bottom faces to permit free movement of the rising wax particles. It will be observed that the rising layers of wax particles move upwardly while in contact with the upwardly inclined bottom faces of the baffles, and that said wax particles repeatedly intersect the descending solvent while rising from one upwardly inclined plane to another. The deoiled wax may be discharged through a pipe 24 above the inlet for the deoiling solvent.

The inclined faces of the baffles tend to prevent the wax particles from clinging to said baffles. However, any suitable mechanical means may be employed to prevent or limit the growing of wax crystals which might otherwise extend from the bottom faces of the baffles. For example, the central baffles 23 may be fixed to a slowly rotating shaft 25, so as to rotate with the shaft, and scrapers 26 may extend from the top faces of these rotary baffles to remove waxy material from the bottoms of the stationary baffle rings 22. These stationary baffles may be likewise provided with scrapers 27 extending from their top faces to remove waxy material from the bottom faces of the rotating baffles. In each case, the scrapers extend from the top of one baffle to a point adjacent to the bottom of the next higher baffle. It is not necessary to forcibly scrape the baffles, the object being to limit the thickness of any wax deposit tending to grow on the baffles.

An interesting condition appears in the effective cleansing of the disintegrated wax particles due to the forcible scrubbing and dissolving action of the selective deoiling solvent which repeatedly crosses the path of the wax in the deoiling zone. Attention is also directed to the condition at the lower portion of this deoiling zone where the outgoing solvent stream is diverted from the disintegrating and settling zones. The used deoiling solvent and its dissolved oil solution may descend through a settling zone 28 below the wax inlet pipe 16, and pass out as a separate stream through a discharge pipe 29 at the bottom of said settling zone. Any of the relatively light wax particles swept into the settling zone 28 will eventually rise to the counterflow zone, instead of descending to the discharge pipe 29.

A substantial advantage may be gained by transmitting the used deoiling solvent and its dissolved oil from the counterflow deoiling zone to the incoming stream of wax-containing oil, so as to provide or complete the continuous stream of dewaxing solvent. As a diagrammatical illustration of this feature we have shown a pump 30 arranged to force a continuous stream of the used dewaxing solution from the discharge pipe 29 and through a regulating valve 31 to the pipe 4, thereby transmitting the used deoiling solvent, and the oil recovered therein, to the incoming oil stream. The oil recovered in the deoiling zone is thus returned to the system, while the selective deoiling solvent economically is employed in forming the selective dewaxing solution.

We claim:

1. In an apparatus for continuously dewaxing oil and deoiling the wax, means for dissolving wax-containing oil in a selective dewaxing solvent, a cooler wherein the solution is cooled to precipitate wax in the liquid solution of oil and solvent, while trapping portions of the oil solution in clusters of the precipitated wax, dewaxing means whereby free portions of the liquid oil solution are separated from the wax clusters, so as to dewax said free portions of the oil solution, said dewaxing means including a settling chamber having an inlet communicating with said cooler to receive the mixture of free liquid oil solution and wax clusters, said settling chamber also having an outlet for the dewaxed solution and a wax outlet for the wax clusters, deoiling means comprising a wax-disintegrator communicating with said outlet to receive and forcibly disintegrate said wax clusters, thereby liberating trapped oil solution from the wax clusters, a countercurrent deoiling system communicating with said disintegrator to receive a stream of the disintegrated wax particles and liberated oil solution, and means for causing a stream of oil solvent to flow through the stream of disintegrated wax particles in said countercurrent deoiling system, said countercurrent system having an outlet for the disintegrated wax particles, and another outlet for the stream of oil solvent and dissolved oil separated from said wax-disintegrator, so as to provide for independent disintegration of the wax.

2. In an apparatus for continuously dewaxing oil and deoiling the wax, means for dissolving wax-containing oil in a selective dewaxing solvent, a cooler wherein the solution is cooled to precipitate wax in a liquid solution of oil and solvent, while trapping portions of said liquid oil solution in coalesced crystals of the precipitated wax, dewaxing means whereby free portions of said liquid oil solution are released from the wax and thereby dewaxed without requiring filtration of said free portions of the solution, said dewaxing means including a settling chamber having an inlet communicating with said cooler to receive a mixture of coalesced wax particles and free oil solution, said settling chamber also having an outlet for the dewaxed solution lower than said inlet to provide for the discharge of relatively free dewaxed oil solution, and a wax outlet higher than said inlet to provide for the discharge of coalesced wax crystals, a wax-disintegrator communicating with said wax outlet to receive and forcibly disintegrate the coalesced wax crystals, thereby liberating the trapped oil solution from the wax, a counterflow deoiling system having an inlet communicating with said wax-disintegrator to receive a mixture of the disintegrated wax particles and liberated oil solution, and means for transmitting a regulated descending stream of relatively heavy deoiling solvent through a rising stream of the disintegrated wax particles in said counterflow deoiling system, so as to separate the liberated oil solution from said disintegrated wax particles, said counterflow deoiling system having an outlet for used deoiling solvent separated from said disintegrator and settling chamber to provide for independent flow of deoiling solvent through the deoiling system.

3. In an apparatus for continuously dewaxing oil and deoiling the wax, means for dissolving wax-containing oil in a selective dewaxing solvent, a cooler wherein the solution is cooled to precipitate relatively light wax in the liquid solution of oil and solvent, while trapping portions of the oil solution in clusters of the precipitated wax, dewaxing means whereby free portions of the liquid oil solution are separated from the wax clusters so as to dewax said free portions of the oil solution, said dewaxing means including a settling chamber having an inlet communicating with said cooler to receive a mixture of free liquid solution and wax clusters, said settling chamber also having an outlet for the dewaxed solution lower than said inlet to provide for the discharge of relatively heavy dewaxed solution, deoiling means comprising a wax disintegrator communicating with a higher portion of said settling chamber to receive and forcibly disintegrate a stream of the wax clusters, a countercurrent deoiling system communicating with said disintegrator to receive a stream of the disintegrated wax particles and liberated oil solution, means for introducing a descending stream of relatively heavy deoiling solvent through a rising stream of the disintegrated wax particles in said deoiling system, the upper portion of said deoiling system having an outlet for the disintegrated wax particles, and a lower portion of said deoiling system being provided with a separate outlet for the discharge of a deoiling solvent and dissolved oil from the course of the disintegrated wax particles.

4. In an apparatus for continuously dewaxing oil and deoiling the wax, means for dissolving wax-containing oil in a selective dewaxing solvent, a cooler wherein the solution is cooled to precipitate relatively light wax in the liquid solution of oil and solvent, dewaxing means whereby free portions of the liquid solution are separated from the relatively light wax, said dewaxing means including a settling chamber having an inlet communicating with said cooler to receive a mixture of liquid solution and wax, said settling chamber also having an outlet for the dewaxed solution lower than said inlet to provide for discharge of relatively heavy dewaxed solution, the lighter waxy material being free to coalesce and occlude portions of the oil solution in said settling chamber, releasing means including a wax-disintegrator communicating with the upper portion of said settling chamber to receive and forcibly disintegrate a stream of the coalesced wax particles, thereby liberating occluded oil solution from the coalesced wax, and a countercurrent deoiling system communicating with said disintegrator to separate the liberated oil solution from the disintegrated wax particles, said countercurrent deoiling system having an inlet and an outlet deoiling solvent separated from said wax-disintegrator, so as to provide for continuous flow of deoiling solvent through said deoiling system independently of the flow through said disintegrator.

5. In an apparatus for continuously dewaxing oil and deoiling the wax, means for dissolving wax-containing oil in a selective dewaxing solvent, a cooler wherein the solution is cooled to precipitate relatively light wax in the liquid solution of oil and solvent, dewaxing means whereby free portions of the liquid solution are separated from the relatively light wax, said dewaxing means including a settling chamber having an inlet communicating with said cooler to receive the mixture of liquid solution and wax, said settling chamber also having an outlet for the dewaxed solution lower than said inlet to provide for discharge of the dewaxed solution, the waxy material being free to coalesce and occlude portions of the oil solution in said settling chamber, releasing means comprising a wax-disintegrator communicating with the upper portion of said settling chamber to receive and forcibly disintegrate the coalesced waxy material, thereby liberating occluded oil solution from the coalesced wax, a countercurrent deoiling system communicating with said disintegrator to receive a stream of the disintegrated wax particles and liberated oil solution, the upper portion of said deoiling system having a wax outlet for the discharge of said disintegrated wax particles, said deoiling system being provided with alternating baffles arranged to form a tortuous, zigzag deoiling passageway for the wax particles rising toward said wax outlet, and means for introducing a regulated stream of relatively heavy deoiling solvent into said deoiling system at a point above said baffles to produce a descending deoiling stream contacting with and intersecting the paths of wax particles rising from the baffles, a lower portion of said deoiling system being provided with a separate outlet for the descending deoiling stream, so as to separate said deoiling stream from said disintegrator.

6. In an apparatus for continuously dewaxing oil and deoiling the wax, means for dissolving wax-containing oil in a selective dewaxing solvent, a cooler wherein the solution is cooled to precipitate in the liquid solution of oil and solvent, while trapping portions of the oil solution in clusters of the precipitated wax, dewaxing means whereby free portions of the liquid oil solution are separated from the wax clusters, so as to dewax said free portions of the oil solution, said dewaxing means including a settling chamber having an inlet communicating with said cooler to receive the mixture of free liquid oil solution and wax clusters, said settling chamber also having an outlet for the dewaxed solution and a wax outlet for the wax clusters, deoiling means comprising a wax-disintegrator communicating with said outlet to receive and forcibly disintegrate said wax clusters, thereby liberating trapped oil solution from the wax clusters, a countercurrent deoiling system communicating with said disintegrator to receive a stream of the disintegrated wax particles and liberated oil solution, and means for causing a stream of oil solvent to flow through the stream of disintegrated wax particles in said countercurrent deoiling system, said countercurrent system having an outlet for the disintegrated wax particles, and another outlet for the stream of oil solvent and dissolved oil separated from said wax-disintegrator, so as to provide for independent disintegration of the wax, and conductors including a pump leading from the last mentioned outlet of the countercurrent deoiling system to said means for dissolving wax-containing oil, so as to transmit used oil solvent from said last mentioned outlet to said means for dissolving the wax-containing oil.

7. In an apparatus for continuously dewaxing oil and deoiling the wax, means for dissolving wax-containing oil in a selective dewaxing solvent, a cooler wherein the solution is cooled to precipitate relatively light wax in the liquid solution of oil and solvent, dewaxing means whereby free portions of the liquid solution are separated from the relatively light wax, said dewaxing means including a settling chamber having an inlet communicating with said cooler to receive a mixture of liquid solution and wax, said settling chamber also having an outlet for the dewaxed solution lower than said inlet to provide for discharge of relatively heavy dewaxed solution, the lighter waxy material being free to coalesce and occlude portions of the oil solution in said settling chamber, releasing means including a wax-disintegrator communicating with the upper portion of said settling chamber to receive and forcibly disintegrate a stream of the coalesced wax particles, thereby liberating occluded oil solution from the coalesced wax, and a countercurrent deoiling system communicating with said disintegrator to separate the liberated oil solution from the disintegrated wax particles, said countercurrent deoiling system having an inlet and an outlet for deoiling solvent separated from said wax-disintegrator, so as to provide for continuous flow of deoiling solvent through said deoiling system independently of the flow through said disintegrator, and conductors including a pump leading from said outlet for deoiling solvent to said means for dissolving wax-containing oil, so as to transmit used deoiling solvent and dissolved oil into said means for dissolving the wax-containing oil.

EDDIE M. DONS.
OSWALD G. MAURO.